United States Patent [19]

Arikawa et al.

[11] 4,395,073
[45] Jul. 26, 1983

[54] BRAKE FLUID PRESSURE CONTROL APPARATUS IN SKID CONTROL SYSTEM

[75] Inventors: Tetsuro Arikawa; Yasuo Samatsu, both of Yokosuka, Japan

[73] Assignee: Nippon Air Brake Co., Ltd., Kobe, Japan

[21] Appl. No.: 239,417

[22] Filed: Mar. 2, 1981

[30] Foreign Application Priority Data

Mar. 3, 1980 [JP] Japan .................................. 55-26239
Mar. 14, 1980 [JP] Japan .................................. 55-32827

[51] Int. Cl.³ .............................................. B60T 8/02
[52] U.S. Cl. .................................... 303/116; 303/119
[58] Field of Search ............... 303/119, 117, 116, 115, 303/114, 113, 61-63, 68-69, 10; 188/181

[56] References Cited

U.S. PATENT DOCUMENTS

| | | | |
|---|---|---|---|
| 3,532,391 | 10/1970 | Klein | 303/116 X |
| 3,549,212 | 12/1970 | Leiber | 303/116 |
| 3,550,966 | 12/1970 | Leiber | 303/119 |
| 3,948,568 | 4/1976 | Leiber | 303/119 X |
| 4,278,300 | 7/1981 | Bacher | 303/116 X |

*Primary Examiner*—Douglas C. Butler
*Attorney, Agent, or Firm*—McDougall, Hersh & Scott

[57] ABSTRACT

A brake fluid pressure control apparatus in a skid control system for a vehicle includes a brake fluid pressure control valve device arranged between a master cylinder and wheel cylinders. The device receives control signals from a control unit that measures the skid condition of wheels. The device controls the brake fluid pressure to the wheel cylinders in response to the control signals. A hydraulic reservoir stores the fluid discharged through the device from the wheel cylinders when the pressure to the wheel cylinders is decreased under the control of the device. A fluid pump returns fluid from the reservoir into a pressure fluid supply conduit connecting the master cylinder and the device. A check valve arranged in the supply conduit opens when the fluid flows from the master cylinder towards the device, the outlet of the pump being connected to the conduit between the check valve and the device. A pressure fluid return conduit connects the master cylinder and the wheel cylinders. A check valve arranged in the return conduit opens when the fluid flows from the wheel cylinders towards the master cylinder. A fluid pressure adjusting valve receives fluid discharged from the pump.

6 Claims, 4 Drawing Figures

BRAKE FLUID PRESSURE CONTROL APPARATUS IN SKID CONTROL SYSTEM

BACKGROUND OF THE INVENTION

1. Field of the Invention

This invention relates to a brake fluid pressure control apparatus in a skid control system for a vehicle having at least one wheel and a brake for the wheel in which the brake fluid pressure to the wheel cylinder of the brake for the wheel is controlled in accordance with the rotational condition or skid condition of the wheel, and more particularly to a brake fluid pressure control apparatus of the type in which, when the brake for the wheel is relieved, brake fluid discharged through a fluid pressure control valve device from the wheel cylinder of the brake is returned to a pressure fluid supply conduit connected to a master cylinder by a fluid pump.

2. Description of the Prior Art

Recently, various kinds of skid control systems have been developed for a vehicle having at least one wheel and a brake for the wheel, by which skid control operation for the wheel is performed to avoid a locked wheel condition and obtain good braking performance on any road. In any of the skid control systems, the rotational condition or skid condition of the wheel such as deceleration, slip and acceleration is measured by the control unit which receives the detecting signal of the wheel speed sensor which is associated with the wheel for detecting the rotational speed of the wheel. The brake fluid pressure to the brake for the wheel is controlled on the basis of the measurement of the control unit.

Methods for measuring the rotational condition or skid condition of the wheel can be roughly classified into three. In the first method, slip of the wheel is obtained from the vehicle speed and the wheel speed, and the obtained slip of the wheel is compared with a predetermined slip. In the second method, acceleration or deceleration of the wheel is obtained, and the obtained acceleration or deceleration of the wheel is compared with a predetermined acceleration or decleration. And in the third method, slip and acceleration or deceleration of the wheel are obtained from the vehicle speed and wheel speed, and the obtained slip and acceleration or deceleration of the wheel are compared with the predetermined slip and acceleration or deceleration.

A brake fluid pressure control apparatus is arranged between a master cylinder as a brake pressure generating member and the brake for the wheel. Control signals from the control unit as the measurement result are supplied to the brake fluid pressure control apparatus for increasing and decreasing, or increasing, maintaining at constant, and decreasing the brake pressure to the brake for the wheel.

One example of the brake fluid pressure control apparatus includes a brake fluid pressure control valve device to which the control signals from the control unit are supplied, to control the brake fluid pressure to the wheel cylinder of the brake for the wheel, a hydraulic reservoir for reserving the brake fluid discharged through the brake fluid pressure control valve device from the wheel cylinder of the brake, when relieved, and a fluid pump for returning the brake fluid from the hydraulic reservoir into the pressure fluid supply conduit connecting the master cylinder and the brake fluid pressure control valve device.

In the example of the brake fluid pressure control apparatus, the brake fluid from the wheel cylinder of the brake is discharged into the hydraulic reservoir to relieve the brake for the wheel, and it is returned to the pressure fluid supply conduit by the fluid pump. When the brake for the wheel is relieved, the brake fluid pressure control valve device takes the position to reduce the brake pressure, and therefore to cut off the communication between the master cylinder and the wheel cylinder of the brake for the wheel. Accordingly, the fluid pressure of the brake fluid returned by the fluid pump is applied to the piston of the master cylinder connected to the brake pedal which is treaded by the foot of the drive. The brake pedal is pushed against the tread of the driver. Thus, whenever the brake fluid pressure to the wheel cylinder of the brake changes, the piston of the master cylinder is displaced backwards and forwards. The driver feels disagreeable. The pedal feeling is bad.

SUMMARY OF THE INVENTION

An object of this invention is to provide a brake fluid pressure control apparatus in a skid control system in which, the pedal feeling of the driver, when the driver treads the brake pedal, is good.

An accordance with an aspect of this invention, a brake fluid pressure control apparatus in a skid control system for a vehicle having at least one wheel and a brake for the wheel includes: (A) a fluid pressure control valve device arranged between a master cylinder and a wheel cylinder of a brake for the wheel, the fluid pressure control valve device receiving control signals of a control unit measuring the skid condition of the wheel to control the brake fluid pressure to the wheel cylinder; (B) a hydraulic reservoir which, when the brake fluid pressure to the wheel cylinder is decreased with control of the fluid pressure control valve device, reserves the brake fluid discharged through the fluid pressure control valve device from the wheel cylinder; (C) a pressure fluid supply conduit connecting the master cylinder with the fluid pressure control valve device; (D) a fluid pump for returning the brake fluid from the hydraulic reservoir into the pressure fluid supply conduit, (E) a first check valve arranged in the pressure fluid supply conduit, the first check valve being opened when the brake fluid flows from the master cylinder toward the fluid pressure control valve device, and the outlet of the fluid pump being connected to the pressure fluid supply conduit between the first check valve and the fluid pressure control valve device; (F) a pressure fluid return conduit connecting the master cylinder with the wheel cylinder; (G) a second check valve arranged in the pressure fluid return conduit, the second check valve being opened when the brake fluid flows from the wheel cylinder toward the master cylinder; and (H) means for receiving the brake fluid discharged from the fluid pump.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, fluid pressure control apparatus in skid control systems according to embodiments of this invention will be described with reference to the drawings.

Figure 1:
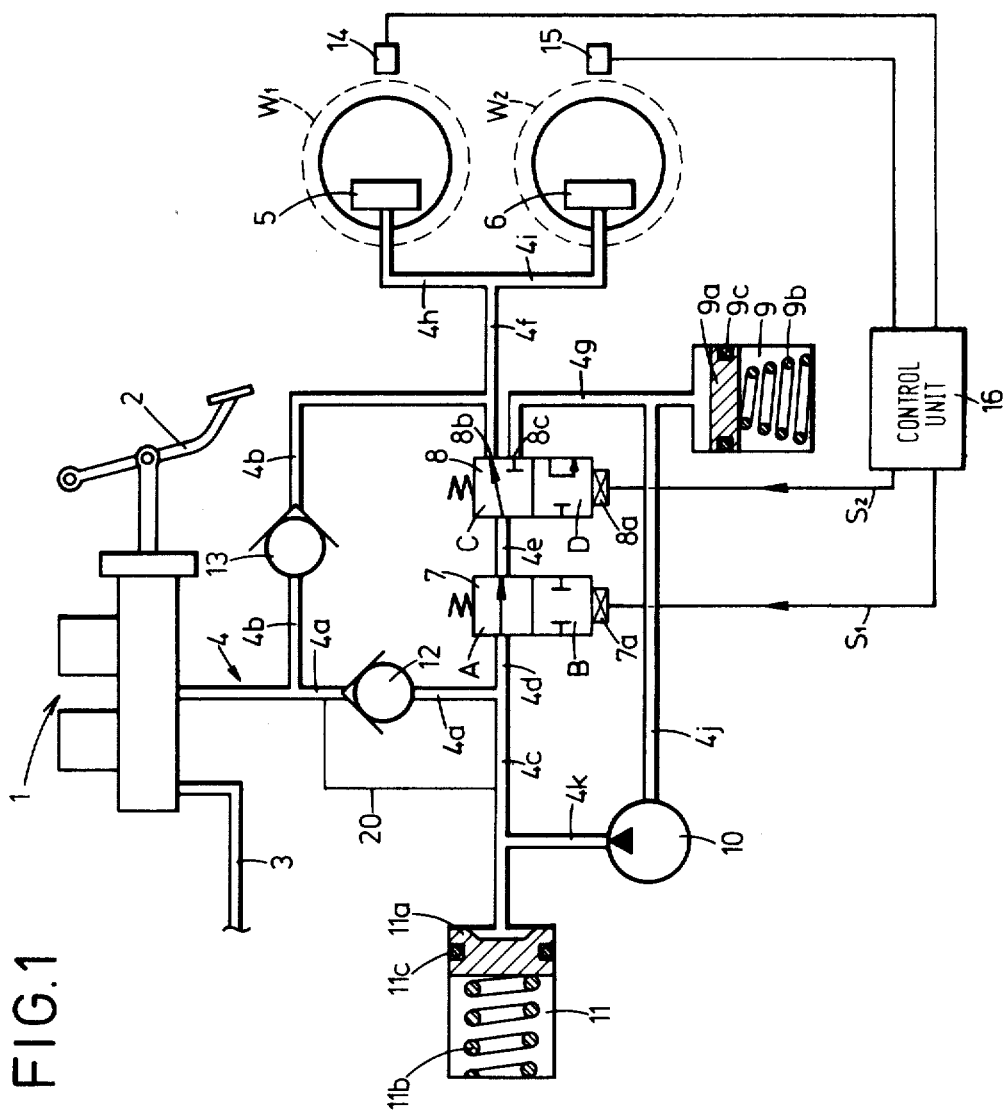
FIG. 1 is a schematic view of a fluid pressure control apparatus in a skid control system according to a first embodiment of this invention.

FIG. 1 shows a fluid pressure control apparatus in a skid control system according to a first embodiment of this invention. It is applied to rear wheels of the vehicle. In FIG. 1, a tandem master cylinder 1 has the well-known structure, and it includes first and second pistons connected through a spring with each other. The first piston is connected to a brake pedal 2 to be treaded by the driver. The cylinder body and, the first and second pistons define first and second brake fluid pressure generating chambers, although not shown. The first brake fluid pressure generating chamber is connected through a conduit 3 to wheel cylinders of the brakes for the front wheels. The second fluid pressure generating chamber communicates with a conduit 4. The conduit 4 is divided into a pressure fluid supply conduit 4a and a pressure fluid return conduit 4b.

The pressure fluid supply conduit 4a is connected through a first check valve 12, a conduit 4d, an electromagnetic inlet valve 7, a conduit 4e, an electromagnetic outlet valve 8, conduits 4f, 4h and 4i to wheel cylinders 5 and 6 of brakes for rear wheels $W_1$ and $W_2$ which are schematically shown. A brake fluid pressure control valve device is constituted by the electromagnetic inlet valve 7 and the electromagnetic outlet valve 8.

On the other hand, the pressure fluid return conduit 4b is connected through a second check valve 13 and the conduits 4f, 4h and 4i to the wheel cylinders 5 and 6 of the brakes for the rear wheels $W_1$ and $W_2$. The direction from the side of the master cylinder 1 to the side of the electromagnetic inlet valve 7 is the forward direction of the first check valve 12. Thus, the fluid from the master cylinder 1 can pass through the first check valve 12 to the electromagnetic inlet valve 7, while the fluid from the electromagnetic inlet valve 7 cannot pass through the first check valve 12. On the other hand, the direction from the side of the wheel cylinders 5 and 6 to the side of the master clinder 1 is the forward direction of the second check valve 13. Thus, the fluid from the wheel cylinders 5 and 6 can pass through the second check valve 13, while the fluid from the master cylinder 1 cannot pass through the second check valve 13.

A supply opening 8b of the electromagnetic outlet valve 8 is connected through the conduits 4f, 4h and 4i to the wheel cylinders 5 and 6. A discharge opening 8c of the electromagnetic outlet valve 8 is connected through a conduit 4g to a hydraulic reservoir 9. In the hydraulic reservoir 9, a piston 9a is supported by a relatively weak spring 9b, and a seal ring 9c is fitted to the piston 9c. The hydraulic reservoir 9 is connected through a conduit 4j to an inlet of a fluid pump 10. An outlet of the fluid pump 10 is connected through a conduit 4k to a hydraulic accumulator 11. In the hydraulic accumulator 11, a piston 11a is supported by a relatively strong spring 11b, and a seal ring 11c is fitted to the piston 11a. The conduit 4k communicates with a conduit 4c which branches from the pressure fluid supply conduit 4a.

Wheel speed sensors 14 and 15 are associated with the rear wheels $W_1$ and $W_2$, and they generate pulse signals having frequencies proportional to the rotational speeds of the rear wheels $W_1$ and $W_2$. The pulse signals of the wheel speed sensors 14 and 15 are supplied to a control unit 16 which has the well-known circuits. On the basis of the detecting outputs of the wheel speed sensors 15 and 16, the skid condition or rotational condition of the rear wheels 5 and 6, namely wheel speeds of the rear wheels 5 and 6, slips thereof, and accelerations or decelerations thereof are calculated or measured by the control unit 16. Control signals $S_1$ and $S_2$ as the calculation or measurement results are generated from the control unit 16, and are supplied to solenoid portions 7a and 8a of the electromagnetic inlet and outlet valves 7 and 8.

Although schematically shown, the electromagnetic inlet and outlet valves 7 and 8 have well-known constructions, and they are called also "cut-off valve", and "discharge valve", respectively. When the control signals $S_1$ and $S_2$ of the control unit 16 are at higher levels "1", the electromagnetic inlet and outlet valves 7 and 8 are energized to take lower positions B and D, respectively. And when the control signals $S_1$ and $S_2$ of the control unit 16 are at lower levels "0", the electromagnetic inlet and outlet valves 7 and 8 are deenergized to take upper positions A and C, respectively.

When the solenoid portions 7a and 8a of the inlet and outlet valves 7 and 8 are not energized, the master cylinder 1 communicates with the wheel cylinders 5 and 6 of the wheels $W_1$ and $W_2$ so that the brake pressure to the wheels $W_1$ and $W_2$ are increased. When both of the solenoid portions 7a and 8a of the inlet and outlet valves 7 and 8 are energized, the communication between the master cylinder 1 and the wheel cylinders 5 and 6 is cut off, and the discharge opening 8c of the outlet valve 8 is connected to the wheel cylinders 5 and 6 to discharge brake fluid into the reservoir 9, so that the brake pressures to the wheels $W_1$ and $W_2$ are lowered. The brake fluid is returned through the conduits 4j and 4k to the conduit 4c by the pump 10. And when only the solenoid portion 7a of the inlet valve 7 is energized, the communication between the master cylinder 1 and the wheel cylinders 5 and 6 is cut off, and however, the supply opening 8b of the outlet valve 8 remains connected with the wheel cylinders 5 and 6, so that the brake pressure to the wheels $W_1$ and $W_2$ are maintained at constant.

Next, there will be described operation of the above-described apparatus.

The driver starts to tread the brake pedal 2 in order to brake the vehicle running at constant speed. It is judged by the control unit 16 receiving the detecting signals of the wheel speed sensors 14 and 15 that the deceleration and slip of the wheels $W_1$ and $W_2$ do not still reach the the predetermined slip and deceleration at the braking start. The control signals $S_1$ and $S_2$ of the control unit 16 are at the lower levels "0". The solenoid portions 7a and 8a of the inlet and outlet valves 7 and 8 are deenergized. The conduits 4d and 4f are made to communicate with each other. The brake fluid from the master cylinder 1 flows through the pressure fluid supply conduit 4a, the first check valve 12, the conduit 4d, the inlet and outlet valves 7 and 8, and the conduits 4f, 4h and 4i into the wheel cylinders 5 and 6 to brake the wheels $W_1$ and $W_2$. On the other hand, the brake fluid from the master cylinder 1 is checked by the second check valve 13.

Accordingly, it cannot flow through the pressure fluid return conduit 4b.

With the increase of the brake fluid pressure to the wheel cylinders 5 and 6, the slip or deceleration of the wheels $W_1$ and $W_2$ meanwhile reaches the predetermined slip or deceleration. The levels of the control signals $S_1$ and $S_2$ becomes higher "1". The solenoid portions 7a and 8a of the inlet and outlet valves 7 and 8 are energized to cut off the communication between the conduits 4a and 4f, and to make the communication between the conduits 4f and 4g. Accordingly, the brake fluid from the wheel cylinders 5 and 6 flows through the conduits 4h, 4i, 4f and 4g into the reservoir 9. The fluid pump 10 is so designed as to start at the time when any one of the control signals $S_1$ and $S_2$ becomes higher "1", and it continues to be driven during the skid control operation. The brake fluid in the reservoir 9 is pumped by the fluid pump 10, and it is led through the conduit 4k in to the pressure fluid supply conduit 4a and the accumulator 11. However, since the first check valve 12 is arranged in the pressure fluid supply conduit 4a, the brake fluid cannot flow to the master cylinder 1, and it is accumulated in the accumulator 11. No "kickback" is imparted to the brake pedal 2. The pedal feeling of the driver is good.

When the deceleration of the wheels $W_1$ and $W_2$ becomes lower than the predetermined deceleration level by function of the inlet and outlet valves 7 and 8, or when the acceleration of the wheels $W_1$ and $W_2$ becomes higher than the predetermined acceleration level, the control signal $S_2$ becomes lower "0", while the control signal $S_1$ remains higher "1", according to the control unit 16 of this embodiment. Accordingly, the solenoid portion 7a of the inlet valve 7 remains energized, while the solenoid portion 8a of the outlet valve 8 is deenergized. The communication between the conduits 4a and 4f is cut off, and the communication between the conduits 4f and 4g are cut off. Thus, the brake fluid pressure to the wheel cylinders 5 and 6 is maintained at constant, or at the reduced value. Although the fluid pump 10 continues to be driven to lead the brake fluid from the reservoir 9 into the conduit 4k, no "kick-back" is imparted to the brake pedal 2.

When the skid condition of the wheels $W_1$ and $W_2$ comes within the permissible range, both of the control signals $S_1$ and $S_2$ become lower "0" to make the communication between the conduits 4a and 4f, and to increase the brake to the wheels $W_1$ and $W_2$.

The above-described control operations are repeated. Meanwhile, the vehicle speed reaches the desired speed, or the vehicle stops. The brake pedal is released from treading. The fluid pressure at the side of the master cylinder 1 with respect to the second check valve 13 becomes lower than the fluid pressure at the side of the wheel cylinders 5 and 6 with respect to it, with the release of the brake pedal 2, in the pressure fluid return conduit 4b. The brake fluid flows back through the conduits 4h, 4i, 4f and 4b, and the second check valve 13 into the master cylinder 1 from the wheel cylinders 5 and 6. Thus, the wheels $W_1$ and $W_2$ are released from braking.

When the first check valve 12 is closed, some fluid pressure remains at the side of the conduit 4d, and therefore at the wheel cylinders 5 and 6. In order to reduce the influence of the remaining fluid pressure as much as possible, a throttling pipe 20 may be connected between the master cylinder side portion of the conduit 4a and the conduit 4c, as shown in FIG. 1. Since the diameter of the throttling pipe 20 is further smaller than the diameters of the conduits 4a to 4k, the throttling pipe 20 has little influence on the above-described control operation. After the brake pedal 2 is released from treading, the remaining fluid pressure is gradually dissipated in the wheel cylinders 5 and 6 by function of the throttling pipe 20. Of course, the throttling pipe 20 is not always required.

Figure 2:
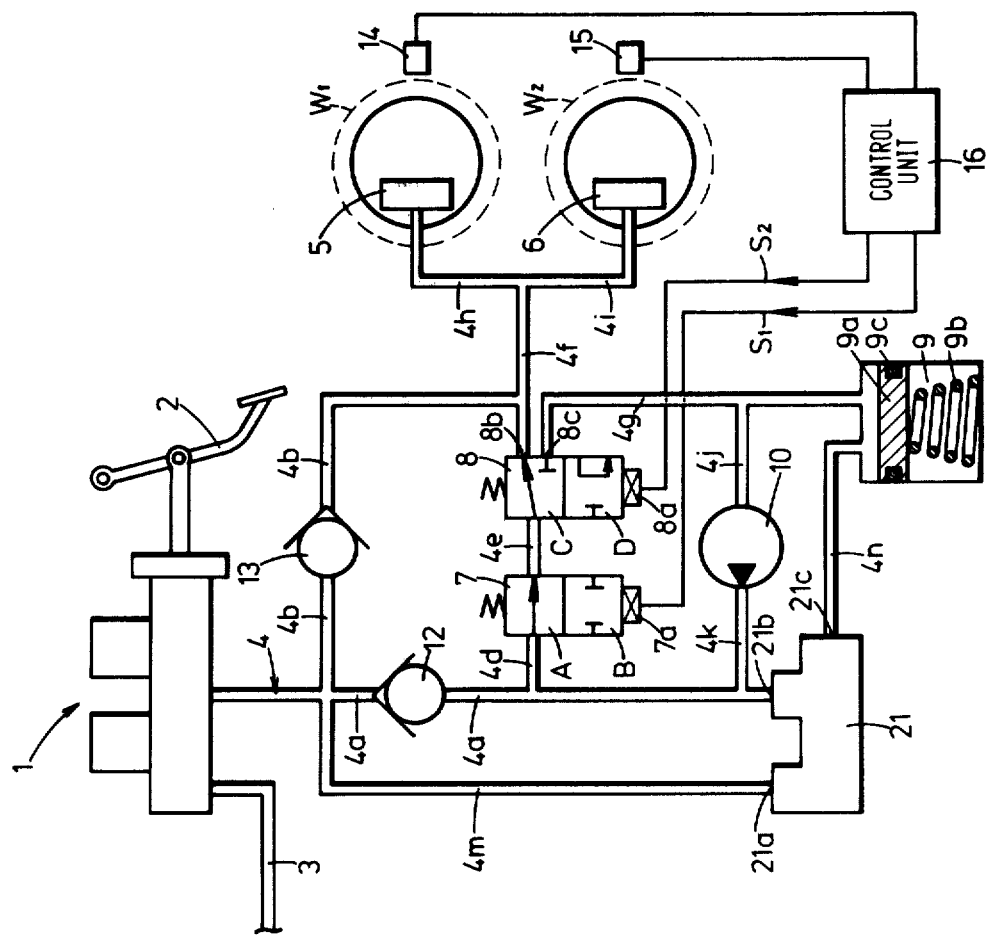
FIG. 2 is a schematic view of a fluid pressure control apparatus in a skid control system according to a second embodiment of this invention.

FIG. 2 shows a fluid pressure control apparatus in a skid control system according to a second embodiment of this invention. Parts in this embodiment which correspond to those in FIG. 1, are denoted by the same reference numerals, the description of which will be omitted.

Figure 3:
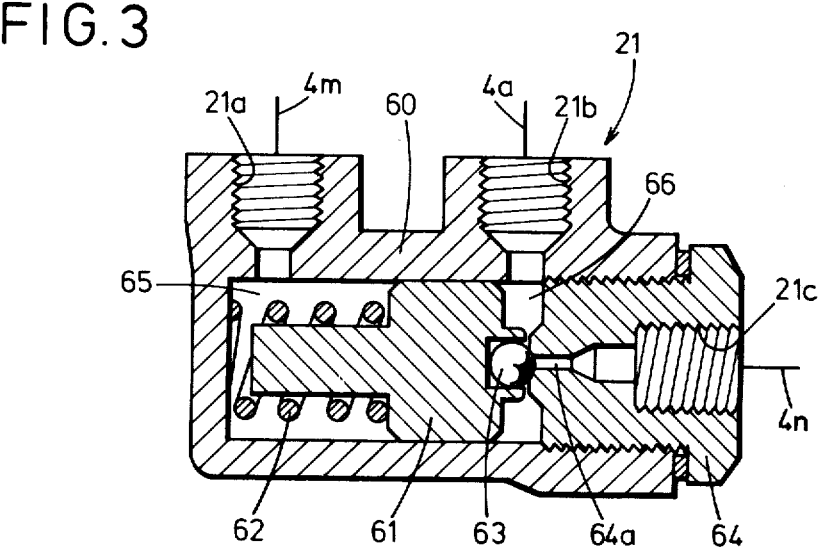
FIG. 3 is a cross-sectional view of a fluid pressure adjusting valve in the apparatus of FIG. 2.

In this embodiment, a fluid pressure adjusting valve 21 is arranged instead of the hydraulic accumulator 11 of the first embodiment. The details of the fluid pressure adjusting valve 21 are shown in FIG. 3. Referring to FIG. 2, a conduit 4m branches from the conduit 4 connected to the master cylinder 1, and it is connected to a first opening 21a of the fluid pressure adjusting valve 21. The conduit 4k connected to the outlet of the fluid pump 10 is further connected to a second opening of the fluid pressure adjusting valve 21. A third opening 21c of the fluid pressure adjusting valve 21 is connected through a conduit 4n to the reservoir 9. Next, there will be described the details of the fluid pressure adjusting valve 21 with reference to FIG. 3.

In the fluid pressure adjusting valve 21, the above described first and second openings 21a and 21b are formed in a cylindrical body 60. A piston 61 is slidably fitted to the cylindrical bore of the body 60. The piston 61 and the cylindrical body 60 define a first chamber 65 at the left side and a second chamber 66 at the right side. The fluid pressure of the master cylinder 1 is transmitted through the conduit 4m and the first opening 21a to the first chamber 65. A cover 64 is screwed to the opening of the cylindrical body 60. The second chamber 66 communicates through the second opening 21b and the conduit 4k with the outlet of the fluid pump 10. The discharging pressure of the fluid pump 10 is transmitted to the second chamber 66. A coil spring 62 is arranged in the compressed condition between the bottom of the cylindrical body 60 and the piston 61. The piston 61 is urged rightwards by the coil spring 62.

The above-described third opening 21c is formed in the cover 64. The third opening 21c includes a path 64a. A ball valve element 63 is fixed on a recess formed on the right end of the piston 61. A valve member is constituted by the ball valve element 63 and the opening of the path 64a. The opening of the path 64a functions as the seat of the ball valve element 63. The valve member is closed in FIG. 3.

As described with reference to FIG. 1, the fluid pump 10 is driven during the skid control operation. When the discharging pressure of the fluid pump 10 is higher than the urging force of the coil spring 62 plus the fluid pressure of the master cylinder 1, the piston 61 is moved leftwards to separate the ball valve element 63 from the opening of the path 64a. The brake fluid discharged by the fluid pump 10 is returned through the path 64a, the third opening 21c and the conduit 4n into the reservoir 9. Accordingly, no excessive load is applied to the fluid pump 10.

Figure 4:
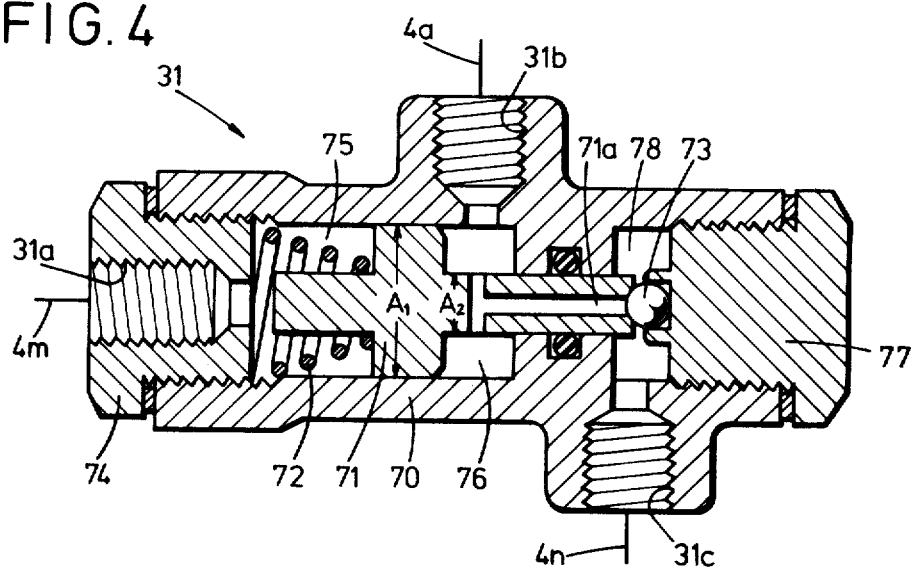
FIG. 4 is a cross-sectional view of a modification of the fluid pressure adjusting valve of FIG. 3.

FIG. 4 shows a modification 31 of the fluid pressure adjusting valve 21 of FIG. 3. In this modification 31, a first cover 74 is screwed to a left opening of a cylindrical body 70. A first opening 31a is formed in the first cover 74, and it communicates through the conduit 4m with the master cylinder 1. A second cover 77 is screwed to a right opening of the cylindrical body 70. A ball valve element 73 is fixed in a recess formed on the inner end of the second cover 64. A stepped piston 71 is slidably fitted to a stepped cylindrical bore of the body 70. A T-shaped path 71a is formed in the right reduced portion of the stepped piston 71. A valve member is constituted by the right opening of the T-shaped path 71a and the ball valve element 73. A first chamber 75 is defined by the first cover 74 and the stepped piston 71. The fluid pressure of the master cylinder 1 is transmitted through the conduit 4m and the first opening 31a to the first chamber 75. A second chamber is defined by the stepped piston 71 and the inward projection of the cylindrical body 70. The outlet of the fluid pump 10 communicates through the conduit 4k with the second chamber 76. A third chamber 78 is defined by the second cover 77 and the inward projection of the cylindrical body 70. The reservoir 9 communicates through the conduit 4n and a third opening 31c formed in the body 70 with the third chamber 78. The stepped piston 71 is urged rightwards by a coil spring 72.

In the skid control operation, when the fluid pressure of the second chamber 76 becomes higher than $[A_1/(A_1-A_2)] \times$ fluid pressure of the master cylinder 1, where $A_1$ represents diameter of the larger portion of the stepped piston 71, and $A_2$ represents diameter of the right smaller portion of the stepped piston 71, the latter is moved leftwards to separate the right opening of the T-shaped path 71a from the ball valve element 73. The second and third chambers 76 and 78 communicate with each other. The brake fluid in the second chamber 76 is returned through the T-shaped path 71a, the third chamber 78, the third opening 31c and the conduit into the reservoir 9. No excessive load is applied to the fluid pump 10, as in the fluid pressure adjusting valve 21 of FIG. 3.

While the preferred embodiments have been described, variations thereto will occur to those skilled in the art within the scope of the present inventive concepts which are delineated by the following claims.

The example, in the above embodiments, the brake fluid pressure to the wheel cylinders 5 and 6 is decreased, maintained at constant and increased in accordance with the skid condition of the wheels $W_1$ and $W_2$. However, this invention may be applied to the skid control operation that the brake fluid pressure to the wheel cylinders 5 and 6 is alternately decreased and increased in accordance with the skid condition of the wheels $W_1$ and $W_2$. In that case, the inlet valve 7 may be omitted.

Further, in the above embodiment, the skid control system is applied to the rear wheels $W_1$ and $W_2$. However, the apparatus of FIG. 1 or FIG. 2 may be applied also to the front wheels of the vehicle. Or the apparatus of FIG. 1 or FIG. 2 may be applied to each of the wheels of the vehicle.

Further, the above embodiments are applied to the four-wheeled vehicle. However, this invention may be applied to a two-wheeled vehicle or a motor-cycle.

What is claimed is:

1. A brake fluid pressure control apparatus in a skid control system for a vehicle having at least one wheel and a brake for the wheel comprising:

(a) a fluid pressure control valve device arranged between a master cylinder and wheel cylinder of said brake for the wheel, said fluid pressure control valve device receiving control signals of a control unit measuring the skid condition of the wheel to control the brake fluid pressure to said wheel cylinder;

(b) a hydraulic reservoir which, when the brake fluid pressure to said wheel cylinder is decreased with control of said fluid pressure control valve device, reserves the brake fluid discharged through said fluid pressure control valve device from said wheel cylinder;

(c) a pressure fluid supply conduit connecting said master cylinder with said fluid pressure control valve device;

(d) a fluid pump for returning the brake fluid from said hydraulic reservoir into said pressure fluid supply conduit;

(e) a first check valve arranged in said pressure fluid supply conduit, said first check valve being opened when the brake fluid flows from said master cylinder toward said fluid pressure control valve device, and the outlet of said fluid pump being connected to said pressure fluid supply conduit between said first check valve and said fluid pressure control valve device;

(f) a pressure fluid return conduit connecting said master cylinder with said wheel cylinder;

(g) a second check valve arranged in said pressure fluid return conduit, said second check valve being opened when the brake fluid flows from said wheel cylinder toward said master cylinder; and (h) means for receiving the brake fluid discharged from said fluid pump, said receiving means being a fluid pressure adjusting valve having a chamber, said brake fluid discharged from said fluid pump being led into said chamber of the fluid pressure adjusting valve and said chamber, when said valve is opened, communicating with said hydraulic reservoir.

2. A brake fluid pressure control apparatus in a skid control system according to claim 1, in which said fluid pressure adjusting valve comprises a body having a cylindrical bore, a piston slidably fitted to said cylindrical bore, and a valve element associated with said piston, and said chamber and a second chamber are defined by said body and said piston, said first-mentioned chamber communicating with the outlet of said fluid pump, and said second chamber communicating with the master cylinder.

3. A brake fluid pressure control apparatus in a skid control system according to claim 2, in which said piston is urged towards said first-mentioned chamber from said second chamber by a spring.

4. A brake fluid pressure control apparatus in a skid control system according to claim 1, in which said fluid pressure adjusting valve comprises a body having a stepped cylindrical bore, a stepped piston slidably fitted to said stepped cylindrical bore, and a valve element associated with said stepped piston, and said chamber, a second chamber and a third chamber are defined by said body and said stepped piston, said first-mentioned chamber communicating with the outlet of said fluid pump, said second chamber communicating with the master cylinder, and said third chamber communicating with said hydraulic reservoir.

5. A brake fluid pressure control apparatus in a skid control system according to claim 1, in which said fluid pressure control valve device comprises an electromagnetic inlet valve and an electromagnetic outlet valve.

6. A brake fluid pressure control apparatus in a skid control system according to claim 1, in which said first check valve is bypassed by a throttling pipe.

* * * * *